United States Patent Office 2,772,141
Patented Nov. 27, 1956

2,772,141

MANUFACTURE OF PLASTIC FLOOR COVERING

Lawrence H. Dunlap, Lancaster Township, Lancaster County, Pa., assignor to Armstrong Cork Company, Lancaster, Pa., a corporation of Pennsylvania No Drawing. Application February 26, 1952,
Serial No. 273,560

13 Claims. (Cl. 18—47)

This invention relates to the manufacture of plastic floor covering. More particularly, the invention relates to the manufacture of molded inlaid plastic floor covering and the like, in which the pattern is formed essentially of inlays of granulated inlaying compositions compacted into a homogeneous mass onto a suitable backing, such as burlap or waterproof felt.

In the manufacture of molded inlaid plastic floor coverings, the inlaying composition is formed of a filler such as wood flour, finely-divided cork particles, and the like, and a binder therefor; for example, a vinyl resin which may be polyvinyl chloride, copolymers of vinyl chloride and vinyl acetate containing about 5% to 15% by weight of polymerized vinyl acetate, and mixtures of such vinyl resins with rubberlike materials; for example, a mixture containing 40% to 60% by weight of polyvinyl chloride and 60% to 40% by weight of a synthetic rubber such as a rubberlike copolymer of butadiene and acrylonitrile. A mix containing the plastic binder and filler is granulated under carefully controlled conditions to obtain a fine particle size; and in the manufacture of molded inlaid floor covering, a backing of burlap or saturated felt is passed over an inlaying table under a series of stencils, and the granulated inlaying composition is strickled through the stencils onto the backing in the desired pattern. Each stencil serves to define the outline of an inlaid area of a separate color. As the material moves through the machine past the complete set of stencils, the entire surface of the backing is covered with inlaying composition. The composition is in a relatively loose condition and is subseqeuntly subjected to heat and high pressure in the neighborhood of about 300° F. to about 350° F. and about 400 to about 1450 pounds per square inch to consolidate it into a wear-resisting surface of the desired final thickness, properly keyed to the backing material. Heated platen hydraulic presses are generally used for this purpose.

One great problem present in the manufacture of molded inlaid plastic floor covering is centered around the great tendency of the inlaying composition to adhere to the presses. Generally speaking, it is necessary to provide some form of releasing element to enable the press to be withdrawn from the consolidated composition without considerable amounts of the composition adhering to the press plate. The conventional paraffin oil-saturated papers used in the manufacture of molded inlaid linoleum cannot be employed in the manufacture of molded inlaid plastic flooring because they adhere too strongly to the consolidated surface of the sheet after removal from the press. This results in extreme difficulty in removing the release paper from the surface of the consolidated sheet.

A number of press release papers and lubricants have been tried in an effort to overcome this severe problem of adherence between the press platen and the consolidated inlaying composition. Many of these are unsuitable because of difficulty of removal from the consolidated sheet. Others are unsuitable because of the objectionable fumes given off during the consolidation operation.

I have found that molded inlaid plastic floor covering compositions may be released from heated press platens by providing a film between the surface of the press platen and the surface of the goods, which film comprises a complex compound of the Werner type in which a trivalent nuclear chromium atom is coordinated with an acyclic carboxylic acido group having at least 10 carbon atoms. Such materials are sold under the trade name "Quilon" and are described and claimed in U. S. Patent 2,273,040, granted February 17, 1942. As disclosed in this patent, the materials may be described as Werner complex compounds characterized by having therein associated with a trivalent nuclear chromium atom and an acyclic carboxylic acido group having at least 10 carbon atoms. Such acido groups are described as functional acido groups and may be present as simple coordinated groups held by either principal or auxiliary valences, or they may be present as bridging groups between two nuclear chromium atoms. Particular acido groups may conveniently be designated by adding the suffix "ato" to the first portion of the name of the carboxylic acid corresponding to the acido group. For instance, stearic acid gives "stearato" groups, palmitic acid gives "palmitato" groups, and lauric acid gives "laurato" groups. I have obtained particularly advantageous results in releasing molded plastic flooring from heated press platens by applying a film containing stearato chromyl chloride.

In accordance with my invention, the complex compound of the Werner type may be applied to the press platen by any suitable method, such as spraying, roll coating, and the like. After the pressing operation, the molded material is readily separated from the press platen. A particularly advantageous method of effecting the release of molded goods from the press platen involves applying a film of the Werner complex compound to a suitable paper backing and placing the coated paper between the press platen and the goods prior to the initial pressing of the molding operation. The coated paper may be prepared by applying a continuous film of Werner complex compound to a smooth-surfaced paper, which may be any of a number of commercially available papers such as a clay-filled sulfite pulp paper. One method of obtaining the coated paper includes applying a continuous film of Werner complex compound to the paper by means of a rubber roll coater and heating to dry and convert the film to a water-insoluble state. This may be accomplished by heating the coated paper at about 100° C. to 105° C. for a short time, such as about 1 to 2 minutes.

One particular system which has been found to be very suitable in the manufacture of molded plastic floor coverings is comprised of a plurality of presses. In the manufacture of molded plastic flooring in such a system, a granular inlaying composition, which may contain pigment, filler, and a binder containing a blend of polyvinyl chloride and butadiene-acrylonitrile rubber, is distributed into a desired pattern by means of the stencils over the molded tables. The mass is passed under the first press, known as the consolidation press, the upper platen of which is maintained at a temperature between about 300° F. and about 350° F. and the lower platen of which is maintained within the same temperature range. Between the surfaces of the goods on the upper platen is placed a paper coated with the complex Werner type compounds described above. A pressure of approximately 400 pounds per square inch is applied to the goods by means of a ram, which forces the material into contact with the upper platen. The dwell of the press is normally about 7 seconds. The provision of the coated paper between the press platen and the surface of the goods enables ready release of the consolidated mass from the first press. Following this initial pressing, the consolidated mass is passed into a second press, known as the making press, the upper platen of which is maintained at a temperature between about 300° F. and about 350° F. and the lower platen of which is unheated. In this press, the consolidated mass is subjected to a pressure of about 1450 pounds per square inch for a period of about 7 seconds, while maintaining the layer of coated paper between the press platen and the goods. Upon release of the pressure, the paper is readily removed from the face of the goods, which are then ready to be subjected to stoving if desired.

Of course, the particular temperatures of the press platens depend upon the nature of the inlaying composition. For example, when the composition is comprised essentially of polyvinyl chloride or copolymers of vinyl chloride and vinyl acetate, both platens of both the making and consolidation presses are maintained at temperatures between about 300° F. and about 350° F.

In lieu of a coated paper, it is also possible within the scope of my invention to roll coat the releasing agent directly upon the upper platen of the press, which comes into contact with the surface of the goods. It is also possible to apply a thin film of the Werner type compound to the upper surface only of a loose mass of granulated inlaying composition before passage under the press. However, I have obtained particularly advantageous results by utilizing the release paper coated with a film of the Werner type compound.

The releasing agent is comparatively inexpensive and is useful over a very wide range of temperatures. Papers coated with the releasing agent can be stripped easily at the temperatures obtaining in the molded process and furnish a smooth, glossy surface. The stripped papers may be used repeatedly, thereby reducing considerably the cost of the process.

I claim:

1. In a method of forming a vinyl plastic mass, the steps comprising providing between the surface of said mass and a pressing surface a release layer of a complex compound of the Werner type in which a trivalent nuclear chromium atom is coordinated with an acyclic carboxylic acido group having at least 10 carbon atoms, with said release layer lying in direct engagement with said vinyl plastic mass, forming said vinyl plastic mass by the application of heat and pressure thereto through said release layer, discontinuing the application of pressure, and releasing said formed vinyl plastic mass from said pressing surface, said layer facilitating said release.

2. A method in accordance with claim 1 in which the complex compound of the Werner type is one in which a trivalent nuclear chromium atom is coordinated with a stearato group.

3. A method in accordance with claim 1 in which the complex compound of the Werner type is one in which the trivalent nuclear chromium atom is coordinated with a palmitato group.

4. A method in accordance with claim 1 in which the Werner type compound is one in which a trivalent nuclear chromium atom is coordinated with a laurato group.

5. In a method of forming a vinyl plastic mass, the steps comprising providing between the surface of said mass and a pressing surface a paper coated with a complex compound of the Werner type in which a trivalent nuclear chromium atom is coordinated with an acyclic carboxylic acido group having at least 10 carbon atoms, with said coating lying in direct engagement with said vinyl plastic mass, forming said vinyl plastic mass by the application of heat and pressure thereto through said paper, discontinuing the application of pressure, and stripping said paper from said formed vinyl plastic mass, said coating facilitating said stripping.

6. A method in accordance with claim 5 in which the Werner type compound is one in which a trivalent nuclear chromium atom is coordinated with a stearato group.

7. A method in accordance with claim 5 in which the Werner type compound is one in which a trivalent nuclear chromium atom is coordinated with a palmitato group.

8. A method in accordance with claim 5 in which the Werner type compound is one in which a trivalent nuclear chromium atom is coordinated with a laurato group.

9. In a method of forming a vinyl plastic mass, the steps comprising providing on the upper surface only of a loose mass of granulated vinyl plastic composition a coating of a complex compound of the Werner type in which a trivalent nuclear chromium atom is coordinated with an acyclic carboxylic acido group having at least 10 carbon atoms, forming said vinyl plastic mass by the application of heat and pressure thereto, discontinuing the application of pressure, and releasing said formed vinyl plastic mass from said pressing surfaces, said coating facilitating said release.

10. In a method of making molded vinyl plastic floor coverings by consolidation of a vinyl plastic mass with a plurality of pressing surfaces, the steps comprising providing on each of said pressing surfaces which contacts the surface of said vinyl plastic mass a coating of a complex compound of the Werner type in which a trivalent nuclear chromium atom is coordinated with an acyclic carboxylic acido group having at least 10 carbon atoms, forming said vinyl plastic mass by the application of heat and pressure thereto successively by said coated pressing surfaces, and releasing said formed vinyl plastic mass from each of said successivve pressing surfaces, said coating on each of said pressing surfaces facilitating said release.

11. In a method of forming a vinyl plastic mass, the steps comprising providing between a pressing surface and the surface of a mass including a vinyl plastic selected from the group consisting of (a) polyvinyl chloride, (b) copolymers of vinyl chloride and vinyl acetate, and (c) a mixture of polyvinyl chloride and a rubberlike copolymer of butadiene and acrylonitrile a release layer of a complex compound of the Werner type in which a trivalent nuclear chromium atom is coordinated with an acyclic carboxylic acido group having at least 10 carbon atoms, with said release layer lying in direct engagement with said vinyl plastic mass, forming said vinyl plastic mass by the application of heat and pressure thereto through said release layer, discontinuing the application of pressure, and releasing said formed vinyl plastic mass from said pressing surface, said layer facilitating said release.

12. A method in accordance with claim 11 in which the temperature of the pressing surface is in the order of 300° F. to 350° F.

13. A method in accordance with claim 12 in which the pressure applied to the vinyl plastic mass is in the order of 400 to 1450 pounds per square inch.

References Cited in the file of this patent

UNITED STATES PATENTS

| | | |
|---|---|---|
| 2,272,847 | Macht | Feb. 10, 1942 |
| 2,273,040 | Iler | Feb. 17, 1942 |
| 2,288,559 | Ward | June 30, 1942 |
| 2,425,719 | Berger | Aug. 19, 1947 |
| 2,478,165 | Collins | Aug. 2, 1949 |